United States Patent
Mutschler

(10) Patent No.: US 10,044,482 B2
(45) Date of Patent: Aug. 7, 2018

(54) APPARATUS AND METHOD FOR TRANSMITTING A MESSAGE TO MULTIPLE RECEIVERS

(75) Inventor: Christopher Mutschler, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 219 days.

(21) Appl. No.: 14/355,032

(22) PCT Filed: Oct. 31, 2011

(86) PCT No.: PCT/EP2011/069169
§ 371 (c)(1),
(2), (4) Date: Aug. 8, 2014

(87) PCT Pub. No.: WO2013/064175
PCT Pub. Date: May 10, 2013

(65) Prior Publication Data
US 2014/0355604 A1    Dec. 4, 2014

(51) Int. Cl.
*H04L 12/28* (2006.01)
*H04L 5/00* (2006.01)
(Continued)

(52) U.S. Cl.
CPC ............ *H04L 5/0055* (2013.01); *H04L 12/18* (2013.01); *H04L 12/1868* (2013.01); *H04L 47/10* (2013.01)

(58) Field of Classification Search
CPC .................................................. H04L 5/0055
See application file for complete search history.

(56) References Cited

U.S. PATENT DOCUMENTS 6,507,562 B1 *  1/2003  Kadansky ........... H04L 12/1877
                                                    370/216
6,526,022 B1 *  2/2003  Chiu .................... H04L 1/0002
                                                    370/229
(Continued)

FOREIGN PATENT DOCUMENTS

JP         05219056 A      8/1993
JP      2003273925 A      9/2003
(Continued)

OTHER PUBLICATIONS

Banavar et al, "An Efficient Multicast Protocol for Content-Based Publish-Subscribe Systems," IBM J. Watson Research Center, Hawthorne, NY, pp. 1-9.
(Continued)

*Primary Examiner* — Chi H Pham
*Assistant Examiner* — Fahmida Chowdhury
(74) *Attorney, Agent, or Firm* — Murphy, Bilak & Homiller, PLLC

(57) ABSTRACT

A Method for transmitting a message from a sender (2) to a set of multiple receivers (4a-4d) over a network comprises sending a multicast message (10) to the set of multiple receivers (4a-4d) and receiving acknowledgement messages (12) from a subset of the receivers (4a, 4b, 4d), each acknowledgement message (12) indicating the receipt of the multicast message (10) by a single receiver. The method further comprises sending a unicast message (14) to a receiver of the set of receivers which is not part of the subset of the receivers (4c).

15 Claims, 7 Drawing Sheets

(51) Int. Cl.
*H04L 12/801* (2013.01)
*H04L 12/18* (2006.01)

(56) References Cited

U.S. PATENT DOCUMENTS

| | | | |
|---|---|---|---|
| 7,948,991 | B1 | 5/2011 | Hart et al. |
| 2005/0028219 | A1* | 2/2005 | Atzmon ............. H04N 7/17336 725/116 |
| 2006/0133376 | A1* | 6/2006 | Valdevit ............... H04L 41/024 370/390 |
| 2007/0110063 | A1* | 5/2007 | Tang ...................... H04L 45/02 370/390 |
| 2010/0023828 | A1* | 1/2010 | Weinman ............ H04L 12/1868 714/748 |
| 2010/0073148 | A1 | 3/2010 | Banks |
| 2011/0289543 | A1* | 11/2011 | Goosen ............. H04N 21/4384 725/116 |
| 2012/0023178 | A1* | 1/2012 | Drevon ............. H04L 12/1895 709/206 |

FOREIGN PATENT DOCUMENTS

| | | |
|---|---|---|
| JP | 2007097044 A | 4/2007 |
| JP | 2011211325 A | 10/2011 |
| WO | 03061176 A2 | 7/2003 |

OTHER PUBLICATIONS

Defago et al, "Total Order Broadcast and Multicast Algorithms: Taxonomy and Survey," ACM Computing Surveys, vol. 36, No. 4, Dec. 2004, pp. 372-421.

Floyd et al, "A Reliable Multicast Framework for Light-weight Sessions and Application Level Framing," IEEE/ACM Transactions on Networking, Dec. 1997, pp. 1-19.

Garcia-Molina et al, "Ordered and Reliable Multicast Communication," ACM Transactions on Computer Systems, vol. 9, No. 3, Aug. 1991, pp. 242-271.

Levine et al, "A Comparison of Reliable Multicast Protocols," Multimedia Systems, Springer-Verlag 1998, pp. 334-348.

Opyrchal et al, "Exploiting IP Multicast in Content-Based Publish-Subscribe Systems," J. Sventek and G. Coulson (Eds.): Middleware 2000, Springer-Verlag Berlin Heidelberg 2000, pp. 185-207.

* cited by examiner

APPARATUS AND METHOD FOR TRANSMITTING A MESSAGE TO MULTIPLE RECEIVERS

Embodiments of the present invention relate to data networks and, in particular, to apparatuses and methods for transmitting a message to multiple receivers.

BACKGROUND

The transmission of a message or of data from a single sender to multiple receivers over a network is an issue in multiple scenarios. For example, streaming of audio or video over the internet is a commonly known application. In order to reduce the required bandwidth, various proposals have been made for multicast protocols that require only a single transmission of a message by the sender when the channel or the transmission over the network is error free that is when no packet losses occur. Packet losses or errors are, however, regularly occurring. Reliable multicast protocols, that are multicast protocols trying to assure the receipt of the sender's message at each receiver, employ numerous mechanisms to initiate a retransmission of a multicast message when one of the receivers did not receive the message or when the received message was disrupted.

Some sender controlled mechanisms or protocols require that each receiver sends an acknowledgement message (ACK) to the sender when he safely received the message such that the sender resends the broadcast message when not all expected acknowledgement messages are received within a predetermined time period. Receiver controlled mechanisms usually make use of negative acknowledgement messages (NAKs) when a receiver has not received an expected message in order to trigger a further multicast of the message. However, resending multicast messages does increase the network load between the sender and all receivers, that is on each route between the sender and the receivers. This may be tolerable in audio and video distribution where increased traffic to all receivers can be compensated by a further packet loss without affecting the overall stability of the system, since usually only the quality of the stream decreases for a short time when packet or message losses occur.

There are, however, other systems being far more demanding with respect to an increase of network load, such that an unexpected retransmission of a message over multiple network routes may lead to instability of the whole system. For example, analysis networks or frameworks for analyzing a large amount of data in real time or in almost real time are much more vulnerable to unscheduled or unexpected additional traffic on one or more network segments.

An example for such an analysis framework may be the analysis framework used to analyze the data provided by a sensor network. Sensor networks, for example wireless sensor networks, have a wide range of applications. Wireless sensor networks of various technologies may be used for locating purposes, such as locating or tracking humans and/or other objects. Here, "locating" means the detection or determination of a geographical location or position, while tracking means locating at short time intervals such as to be able to follow the position and other kinematic variables of an observed object.

Some specialized locating or position tracking systems may also be used for locating players and other objects like balls or play equipment in sport events, such as, for example, soccer, American football, rugby, tennis, etc. Due to the rapid movements of the observed objects in such sports events, update intervals for the observed kinematic variables (position, velocity, acceleration) need to be particularly short to provide a reliable tracking. The so arising high data rates of the sensors may require a particularly efficient network or framework for the analysis of the sensors raw data, since different tasks require knowledge on the information of different subsets of the raw data of all sensors at a time. That is, the data of multiple sensors must be compared in order to draw a single useful conclusion or to detect a single event of interest.

To this end, data associated to a single sensor needs to be distributed to different entities or receivers to be processed. This is also the case for event based systems applying a hierarchical analysis approach deriving interdependent events at different hierarchical levels of dependency. An event may generally be defined to be an instantaneous occurrence of interest at a point of time. In general, an event is associated with a change of a related sensed quantity. An event may be a primitive event in a hierarchical base layer, which is directly based on sensor data (kinematic data) of the tracking system, or a composite event of a higher hierarchical order, which is based on previously detected other events. While a hierarchical approach may provide for the possibility to analyze the underlying data in a parallelized manner with multiple processing nodes communicating over a network, the problem persists that also the events have to be sent from their generator, that is from a single sender, to multiple receivers requiring the information of the event in order to fulfill their own tasks. When, however, an unscheduled network load occurs, such as from the rebroadcasting of events, the delay of the complete network may decrease to such an extent that the whole analysis framework becomes unstable. In particular, when individual receivers or network nodes fail to receive the required information in time, an error in the detected events may occur. This may even cause an error propagation through all the related nodes of higher hierarchical levels which depend on the erroneous event, which may in turn result in an instability of the whole system.

It is, therefore, required to provide ways for transmitting a message to multiple receivers in an efficient manner.

SUMMARY

Embodiments of inventive methods for transmitting a message from a sender to a set of multiple receivers over a network achieve this by sending a multicast message to the multiple receivers, by receiving acknowledgement messages from a subset of the receivers, wherein each acknowledgement message indicates the receipt of the message by a single receiver, and by sending a unicast message to a receiver of the set of receivers which is not part of the subset of the receivers. Messages that need to be re-sent since their delivery to a particular receiver cannot be confirmed are re-sent via a unicast protocol that is as a unicast message. Therefore, only the network route from the sender to the particular receiver obtains additional traffic, which does not impose an additional load on the links to the remaining receivers. This may decrease the overall network load significantly and may help to prevent a system relying on or using the network to become unreliable or even unstable.

To this end, a multicast message is understood to be a message which is destined to multiple receivers and sent using a multicast mechanism or protocol that assures that the network or the network equipment, such as switches or routers in the network, forward the message to every receiver of a group of multiple receivers. The message is normally sent only once via a particular link of the network. An example for such a protocol is the IP multicast protocol (IP as an abbreviation for Internet Protocol), using IPv4 addresses 224.0.0.0 to 239.255.255.255 to address a particular group or set of receivers. In IPv6 every address beginning with FF00::/8 may be used to address a group of receivers for multicast purposes.

Consequently, a unicast message is understood to be a message which is destined to only one receiver and sent using a mechanism or protocol that assures that the network or the network equipment forwards the message to the receiver. The message normally creates traffic on a single route from the sender to the receiver. Examples for unicast Protocols of that type are TCP (Transmission Control Protocol) or UDP (User Datagram Protocol).

A message may be a single packet containing a part of the content of a larger logical entity in packet oriented data transmission protocols. However, the term message may also be understood to refer to the logical entity itself, while its payload may span several data packets.

A receiver may, for example, be a computing node connected to a sender's node via the network, or a single process running on a single or on multiple cores of a multicore machine. To this end, a network may, for example, be a network connecting different machines or computers, such as for example an Ethernet, a Token Ring network, or more generally, any kind of LAN (Local Area Network) or WAN (Wide Area Network). However, the term network may, for example, also be understood to refer to the network or the communication links between different CPUs (Central Processing Units) in a multi-CPU Computer.

According to some embodiments, the unicast message is sent after a predetermined period of time after the sending of the multicast message. That is, after making the first attempt to deliver the message a retry is only performed after a minimum delay in order to allow all acknowledgement Messages (ACKs) to reach the sender. In some embodiments, the predetermined period of time, that is the minimum delay is variable over time and depending on a determined network load in order to appropriately account for changing traffic conditions and to assure maximum throughput without additionally crowding the network with unicast Messages sent too early.

According to some embodiments, subscriber data comprising identification information for each receiver of the set of receivers is compared with corresponding identification information of the acknowledgement messages to identify a receiver of the subset of receivers and in order to determine, which of the receivers is to be addressed by a unicast message. Subscriber information may, for example, be an IP-Address of a receiver, a MAC-Address (Media-Access-Control-Address) of an associated Network Device or any other information or fingerprint allowing to uniquely identify the receiver. The subscriber data may, for example, be stored as an ordered or unordered list together with message identification information, which is used to uniquely identify a particular message by comparing the stored message identification information with corresponding message identification information of the acknowledgement messages.

To this end, message identification information for the message may be added to sent message data, the sent message data comprising all message identification information for a particular set of messages sent as a multicast message. The sent message data may be stored in any appropriate format, such as for example in a list, separate or together with the subscriber data, or within a database. The message identification information may, for example, be a hash value computed for the message or a data packet containing at least a part of the message. Alternatively, any other fingerprint may be used as a message identification information to identify a message.

According to some embodiments, identification information of a joining receiver, that is of a receiver desiring to become part of the set of receivers, is added to the subscriber data only after receiving a request for transmission from a joining receiver. This may allow for a parallel use of embodiments of methods for transmitting a message from a sender to a set of multiple receivers according to the invention and of further multicast techniques. The further multicast techniques may, for example, be provided by the network used to transmit the data. Such, part of the possible receivers may subscribe to secured delivery according to an embodiment of the invention, while others may subscribe to unsecure broadcasts, where message or packet losses may be accepted to the benefit of the overall network load.

According to some embodiments, the method is performed in a wired network, where the benefits in terms of efficiency are particularly high, since no shared media access is performed by the individual receivers and the sender.

According to a further embodiment of the invention, messages that need to be re-sent are again sent as a multicast message instead of the unicast message, when the number of receivers in the subset is greater than a predetermined fraction of the number of receivers in the set of receivers. This may help to further decrease the network load when re-sending a multicast is—with respect to the caused network load—more efficient that re-sending multiple unicast messages. In one particular embodiment, the fraction may be one half, while other embodiments may use other fractions, such as for example one fourth or one third.

According to some embodiments, the message is sent from a first event detector (being the sender) to a second event detector (being a receiver) of an event based analysis framework, while the message comprises information about an event detected by the first event detector. In event based analysis frameworks, the majority of data may flow in one message direction which is from event detectors of lower analysis layers (senders) to event detectors of higher analysis layers (receivers) since these rely on the information of the lower layers. That is, it is vital to keep the network traffic in this direction low. This, however, would be inhibited by rebroadcasting a message to all receivers if just one of them has not received it. Sending the acknowledgement messages in the direction opposite to the message direction is, however, feasible without distortion, in particular using full duplex networks. Therefore, using an embodiment of a method for transmitting a message from a sender to a set of multiple receivers is particularly advantageous in an event based analysis framework.

According to an embodiment of the invention, a method for receiving a message from a sender over a network comprises receiving a first message from the sender via a multicast protocol and a second message via a unicast protocol as well as sending a first acknowledgement message and a second acknowledgement message to the sender, the first acknowledgement message and the second acknowledgement messages indicating a receipt of the first and second messages, respectively. The first message is forwarded to an associated application. The second message is deleted without forwarding it to the associated application when the first message is identical to the second message. That is a unicast message may only be delivered or processed further if it differs from any preceding multicast message. This is to assure that the associated application of the receiver only receives messages once, even when a preceding acknowledgement Message did not reach the sender, which made him resend the message as a unicast message. The associated application may be understood to be any process or entity using the message as an input, such as for example higher order programs or devices. However, also higher layers of a network stack are understood to be associated applications with this respect.

Some embodiments of the invention comprise adding a first message identification information for the first message to received message data which comprises message identification information for a set of messages received via the multicast protocol in order to perform the comparison with a second message identification information for a second message received via a unicast message. The message identification information may either be derived by a receiver using an arbitrary algorithm, or it may be extracted from the message itself. Message information may, for example, be a hash value or any other type of a fingerprint.

According to an embodiment of the invention a network interface for converting a multicast communication to an efficient multicast communication comprises an uplink receiver operable to receive a multicast message from a sender which is directed to a set of multiple receivers as well as a downlink multicast-sender operable to send the multicast message to the multiple receivers. The network interface further comprises a downlink receiver operable to receive acknowledgement messages from a subset of the receivers, each acknowledgement message indicating the receipt of the message by a single receiver. The network interface further comprises a downlink unicast-sender operable to send a unicast message to a receiver of the set of receivers which is not part of the subset of the receivers. That is, a network interface may be used to transform a generic or inefficient multicast protocol used by a node supporting generic multicast to the efficient and secure multicast described above. As compared to generic multicast systems using multicast messages for retransmissions of lost packages, the network load may be decreased by simply inserting an embodiment of a network interface. This may be achieved without having to change the communicating senders or receivers themselves.

In summarizing, an embodiment of the present invention allows to establish a secure 1:N multicast transfer mechanism, for example using existing multicast protocols and hardware, while at the same time guaranteeing a safe receipt of data packages or messages. With this respect, safe mean as safe as standard TCP when implementing the concept in and IP-based network. With respect to the embodiments of network interfaces, interfacing between existing multicast scenarios and embodiments of the invention, it is noted that not a single modification is required at the sending and receiving processes/nodes or at all previously installed senders and receivers. Individual receivers may, after installation of the network interface, use a subscription mechanism in order to subscribe to a transmission according to the invention, which may, for example, be performed using the TCP/IP protocol. Further embodiments of the invention may, however, be used in any kind of networks.

BRIEF DESCRIPTION OF THE FIGURES

Some embodiments of apparatuses and/or methods will be described in the following by way of example only, and with reference to the accompanying figures, in which

FIG. 1 shows an example for a network implementing an embodiment of a method for transmitting a message to multiple receivers.

Figure 1:
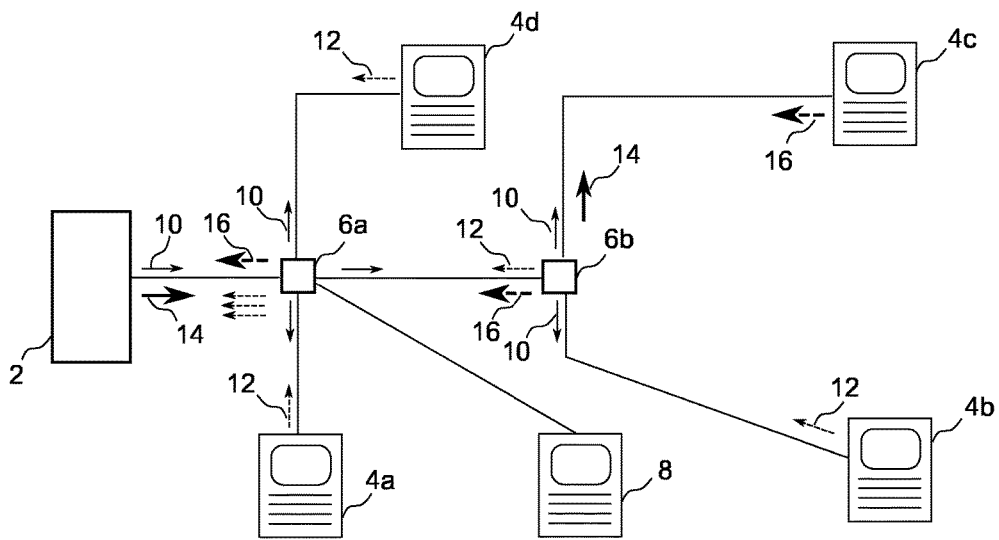
FIG. 1 shows an overview over a network implementing an embodiment of a method for transmitting a message to multiple receivers.

In the embodiment of FIG. 1, a single sender 2 transmits a message to multiple receivers 4a to 4d. It is, as an example, assumed that the message is transmitted using an Ethernet based local area network. Two exemplary switches 6a and 6a are present in order to illustrate how switches or routers capable of a multicast-protocol are operating.

They distribute messages only to their network ports or to network routes having associated therewith a receiver being within the group of the addressed receivers. The notification, which receiver belongs to a particular group of receivers is performed using a common protocol or mechanism. A fifth receiver 8, which is connected to the first switch 6a, does not receive any of the messages broadcast to the receivers 4a to 4d, since he has not signed into the group.

As indicated in FIG. 1, a first transmission to the receivers 4a to 4d is performed via a multicast-protocol, resulting in the multicast message 10 being distributed only via the required links in the network. That is a, node 8 does not receive a copy of the message. In the example shown in FIG. 1, receiver 4c does not send an acknowledgment message 12, while the receivers 4a, 4b and 4d acknowledge the receipt of the message 10. The acknowledgement messages 12 reach the sender 2 and indicate the receipt of the message by the individual receivers. In the network of FIG. 1, the receivers may, for example, be identified by their IP-addresses. Therefore, the sender may compare IP addresses stored in the sender as subscriber data for each receiver in the set of receivers (receivers 4a to 4d) with the senders IP-addresses of the acknowledgment messages in order to conclude, which of the receivers has not yet acknowledgment the receipt of the multicast message 10. After a predetermined period of time, the sender 2 assumes a packet loss for receiver 4c, which did not send an acknowledgment message. Therefore, the sender sends a unicast message 14 to receiver 4c, which is distributed via the network links between the switches 6a and 6b to receiver 4c, while the links between the remaining receivers and the switches do not see any additional traffic.

After receipt of the unicast message 14, receiver 4c sends a second acknowledgment message 16. In receipt of the second acknowledgment message 16, the sender 2 concludes that the last receiver stored within its subscriber data has acknowledged the receipt of the message. Therefore, sender 2 is allowed to delete the message and the corresponding entries of the message identification information for this particular message from its memory, since all required receivers acknowledged the safe receipt of the package or the message.

Figure 2:
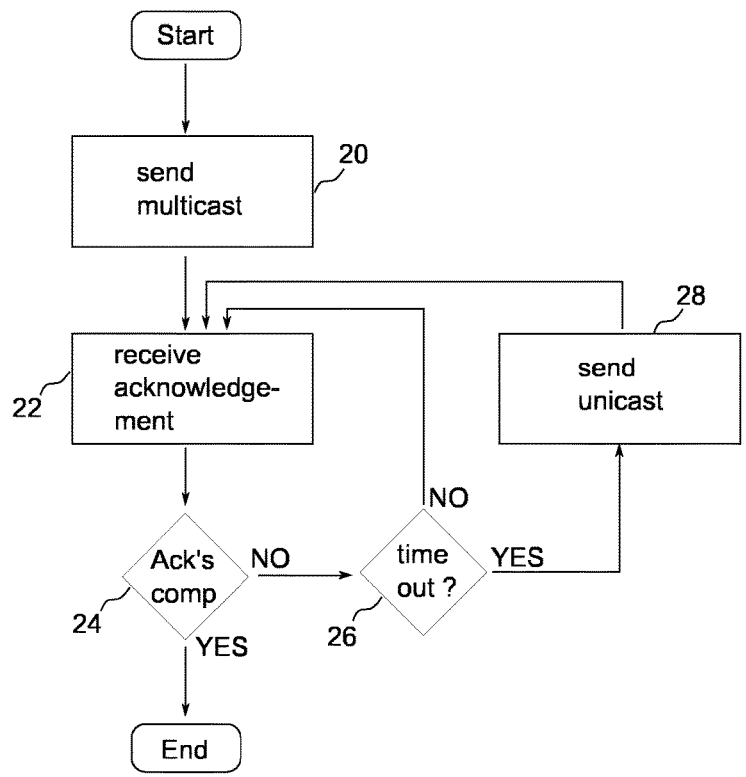
FIG. 2 schematically shows a block diagram of an embodiment of a method for transmitting a message to multiple receivers.

FIG. 2 shows an embodiment of a method for transmitting a message, as incorporated in the network of FIG. 1.

After the transmission is started, a multicast message is sent to the multiple receivers having subscribed to the method for transmitting a message and so became a member of the set of receivers being addressed by the sender. The multicast message is sent in a multicasting step 20. After the sending of the multicast message, acknowledgment messages are received in a reception step 22. In a completeness check 24 it may be checked, e.g. in regular time intervals, whether all receivers have send an acknowledgment message, that is, whether the subset of the receivers having send an acknowledgment message is identical to the set of receivers to which the multicast message had been sent. If this is the case the, the method for transmitting a message ends. If this is not the case it may optionally be checked in a timeout checking step 26, whether a predetermined period of time after sending the multicast has elapsed. If this is not the case the, the method may return to the reception step 22 to receive additional acknowledgment messages.

If, however, the predetermined period of time has elapsed, a unicast message is sent to a receiver of the set of receivers which is not part of the subset of the receivers in a unicasting step 28. That is, the receivers having up to then not sent an acknowledgment message receive a re-transmission of the message via a unicast-protocol.

Figure 3:
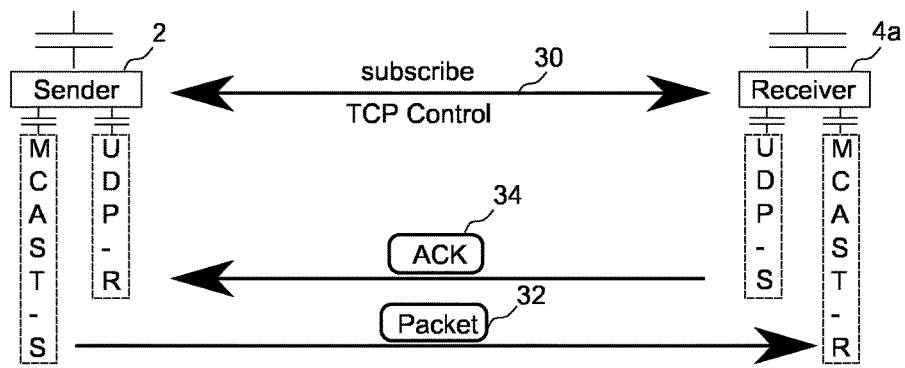
FIG. 3 schematically shows an example for a multicast from a sender to a receiver.

FIG. 3 again illustrates the transmission of a multicast message from a sender 2 to a receiver 4a, after the receiver completed a subscription to the method for transmitting a message offered by the sender. The receiver, for example receiver 4a of FIG. 1 subscribes to the transmission offered by sender 2, using for example TCP messages 30 as a bidirectional reliable communication over IP.

After having notified the sender 2 of the desire to receive messages by subscription, the sender 2 sends a multicast message or a multicast data packet 32 to the receiver, using a predetermined messaging port (an IP port, for example), which is for example arbitrated during the subscription. In the particular example of FIG. 3, the receiver 4a sends an acknowledgment message 34 to the sender using the UDP-protocol and a previously arbitrated or derived port number.

Figure 4:
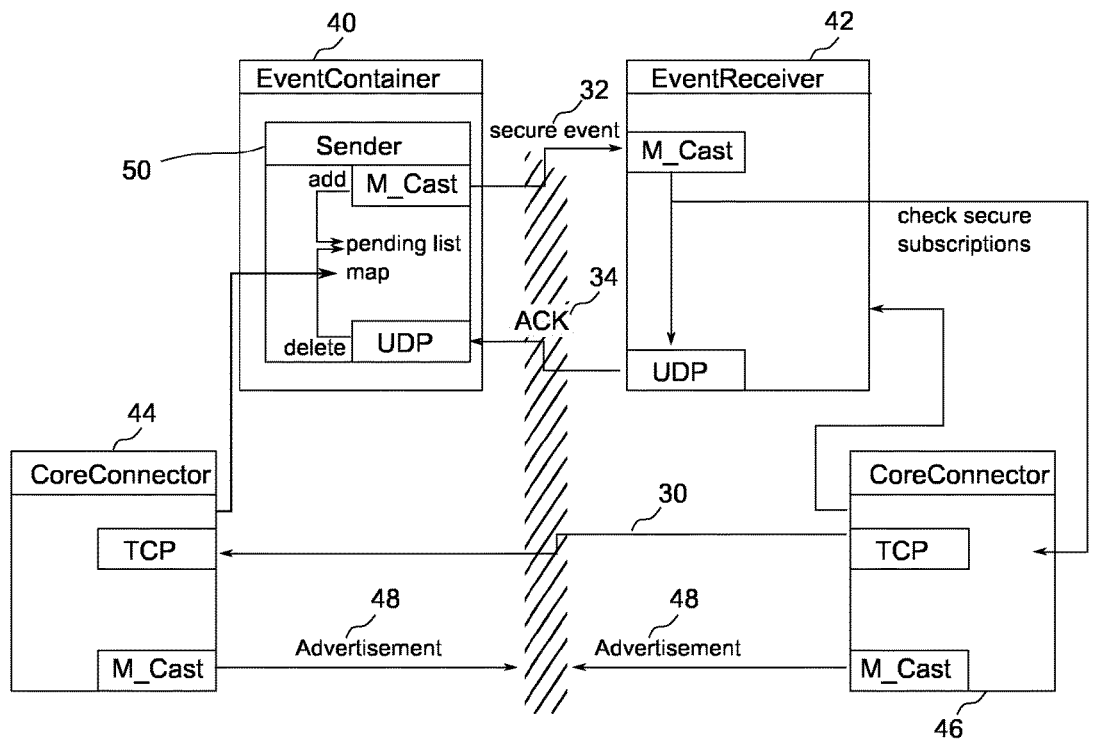
FIG. 4 schematically shows a block diagram of a sender and of a receiver implementing the method illustrated in FIG. 2.

FIG. 4 illustrates the application of a method for transmitting a message from the sender to a set of multiple receivers within an event based analysis framework. In this particular example, sender 40 is a first event detector operating on a data stream in order to identify events of interest based on the datastream. For example, when the datastream comprises position information about the position of an observed object, an event may be detected when the observed object comes into proximity to a predetermined position. Receiver 42 is a second event detector, communicating with the sender 40 by an embodiment of a transmission method. As already elaborated on in FIG. 3, the sender 40 sends a multicast message or packet 32, which is acknowledged by the receiver 42 by means of an acknowledgment package 34 using the UDP-protocol.

In FIG. 4, the subscription mechanism is shown in more detail. In the particular implementation of FIG. 4, the subscription to transmissions of the sender 40 is performed using an intermediate network layer or a middleware, denoted as Core Connector. Core Connectors 44 and 46 are associated to the event detectors 40 and 42 and advertise their capabilities. That is, they inform other event detectors about the type of detected events and further capabilities of their associated event detector via multicast or broadcast advertisement messages 48. When receiver 42 wants to subscribe to the information offered by event detector/sender 40, subscription is performed using a TCP connection 30. The advertisement and the subscription processes are operated by the Core Connectors 44 and 46. Once the Core Connector 44 of the sender/event detector 40 receives the subscription request from the Core Connector 46 associated to the receiver 42, it adds the IP address or any other identification information of the receiver 42 to subscriber data 50 of sender 40 such as to enable the sender 40 to check whether all subscribed receivers (the receivers in the set of receivers addressed) have acknowledged the receipt of a multicast message.

Figure 5:
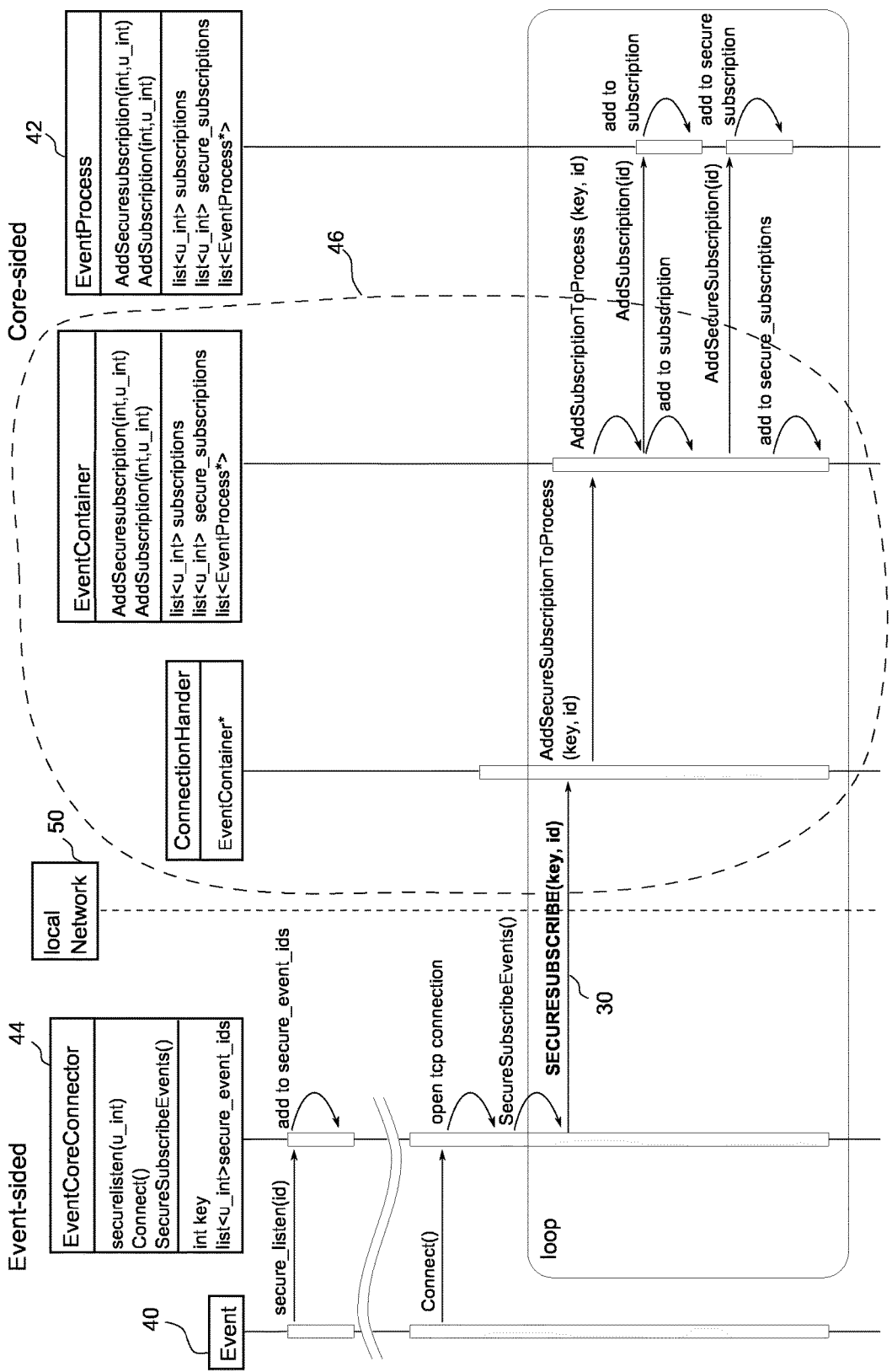
FIG. 5 schematically shows a method for communicating within the method illustrated in FIG. 2.

FIG. 5 illustrates, as to how the sender or event detector 40 of FIG. 4 interacts with Core connector 46 associated to event receiver 42 to establish a transmission according to an embodiment of the invention. As already elaborated on above, core connector 46 of receiver 42 subscribes to the secure transmission offered by Core connector 44 associated to the sender 40 using TCP messages 30 transmitted over a network 50. The core connector 46 adds the subscription to its internal list of secure subscriptions, which is a list comprising all transmission links according to an embodiment of the invention. The core connector 46 furthermore adds the subscribed link to a list of standard subscriptions, which is a list of multicasts according to a mechanism provided by the network itself. This is because a secure transmission is also employing standard transmission protocols or mechanisms, which may be enhanced according to the embodiments of the present invention. The information of the subscription to the secure transmission and the associated standard subscription is forwarded to the event receiver 42 in order to confirm the corresponding request of the receiver 42.

Figure 6:
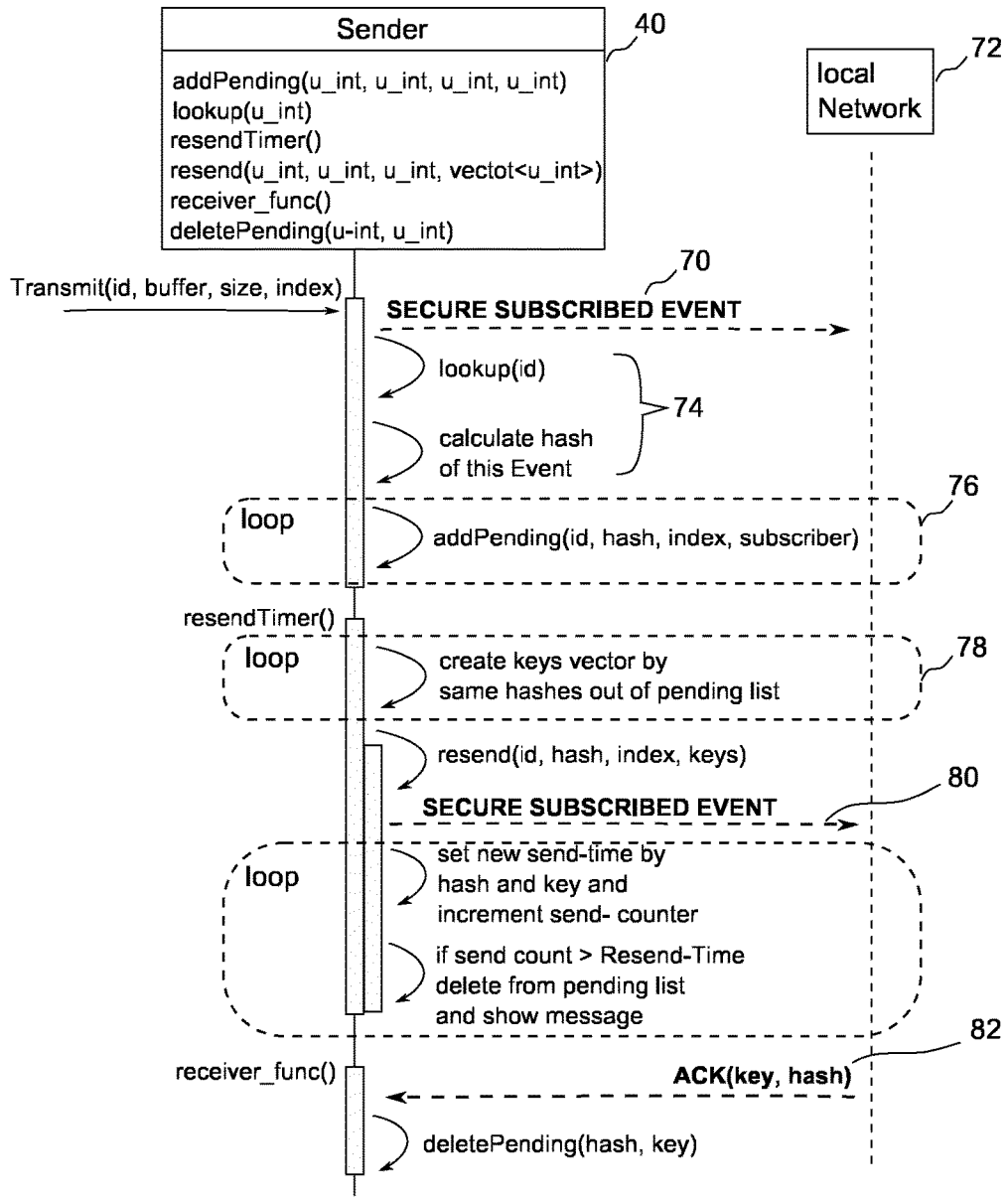
FIG. 6 schematically illustrates a method for transmitting a message according to an embodiment of the present invention.

FIG. 6 illustrates in more detail as to how the sender 40 of FIG. 4 waits for acknowledgment messages of the set of receivers and maintains a list of receivers having acknowledged the receipt. The sender 40 first sends a multicast message 70 to the multiple receivers of the network 72 that are part of the addressed set of receivers. For the ease of understanding, the network 72 and the associated receivers are not shown in FIG. 6, which is only meant to be a flowchart of a part of the method for transmitting a message illustrated in FIG. 2. After having sent an event, that is a message having information about the event via a multicast, a hash value for the sent message is calculated in step 74. The hash value is stored together with a list of subscribed receivers as a list of pending events in the format of a simple list, in a queue or the like.

After a predetermined period of time a vector containing all subscribers not having sent an acknowledgment message so far is created in step 78. Using a unicast protocol, the message is resent to all receivers of the list generated in step 78 in the unicast sending step 80. After that, the list of pending events is updated continuously when acknowledgments are received, such as to be able to delete the list of pending messages when the last acknowledgment message 82 to has been received.

Figure 7:
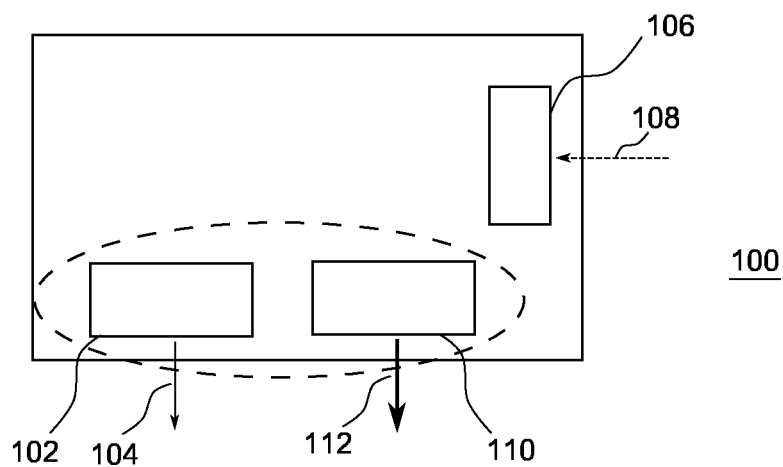
FIG. 7 shows a block diagram for a transmitter according to an embodiment of the present invention.

FIG. 7 shows a block diagram of a Transmitter 100 for transmitting a message from a sender to a set of multiple receivers over a network.

The transmitter 100 comprises a multicast-sender 102 operable to send a multicast message 104 to the multiple receivers.

The transmitter 100 further comprises a receiver 106 operable to receive acknowledgement messages 108 from a subset of the receivers, each acknowledgement message indicating the receipt of the message by a single receiver.

A unicast-sender 110 is operable to send a unicast message 112 to a receiver of the set of receivers which is not part of the subset of the receivers.

Although shown as separate functional blocks in FIG. 7, the unicast-sender 110 and the multicast-sender 102 may well be implemented into a single hardware or software component capable of using different protocols. A transceiver in a hardware implementation may also unite the functionality of the unicast-sender 110 and the multicast-sender 102 as well as of the receiver 106. Generally, functional blocks shown herein only serve to illustrate the functionality of different embodiments while in further embodiments the same functionality may be distributed differently within functional elements, software or hardware components.

Figure 8:
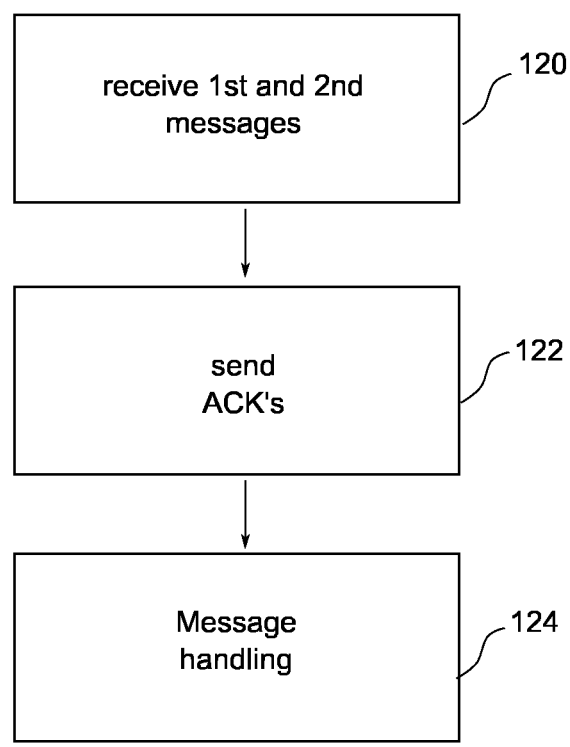
FIG. 8 schematically shows a block diagram of a method for receiving a message according to an embodiment of the present invention.

FIG. 8 schematically shows a block diagram of an embodiment of a method for receiving a message from a sender over a network.

In a reception step 120, a first message from the sender is received via a multicast protocol and a second message is received via a unicast protocol. In an acknowledgement step 122, a first acknowledgement message and a second acknowledgement message are sent to the sender, the first acknowledgement message and the second acknowledgement messages indicating a receipt of the first and second messages, respectively.

In a message handling step 124, the first message is forwarded to an associated application, while the second message is deleted without forwarding it to the associated application when the first message is identical to the second message.

Figure 9:
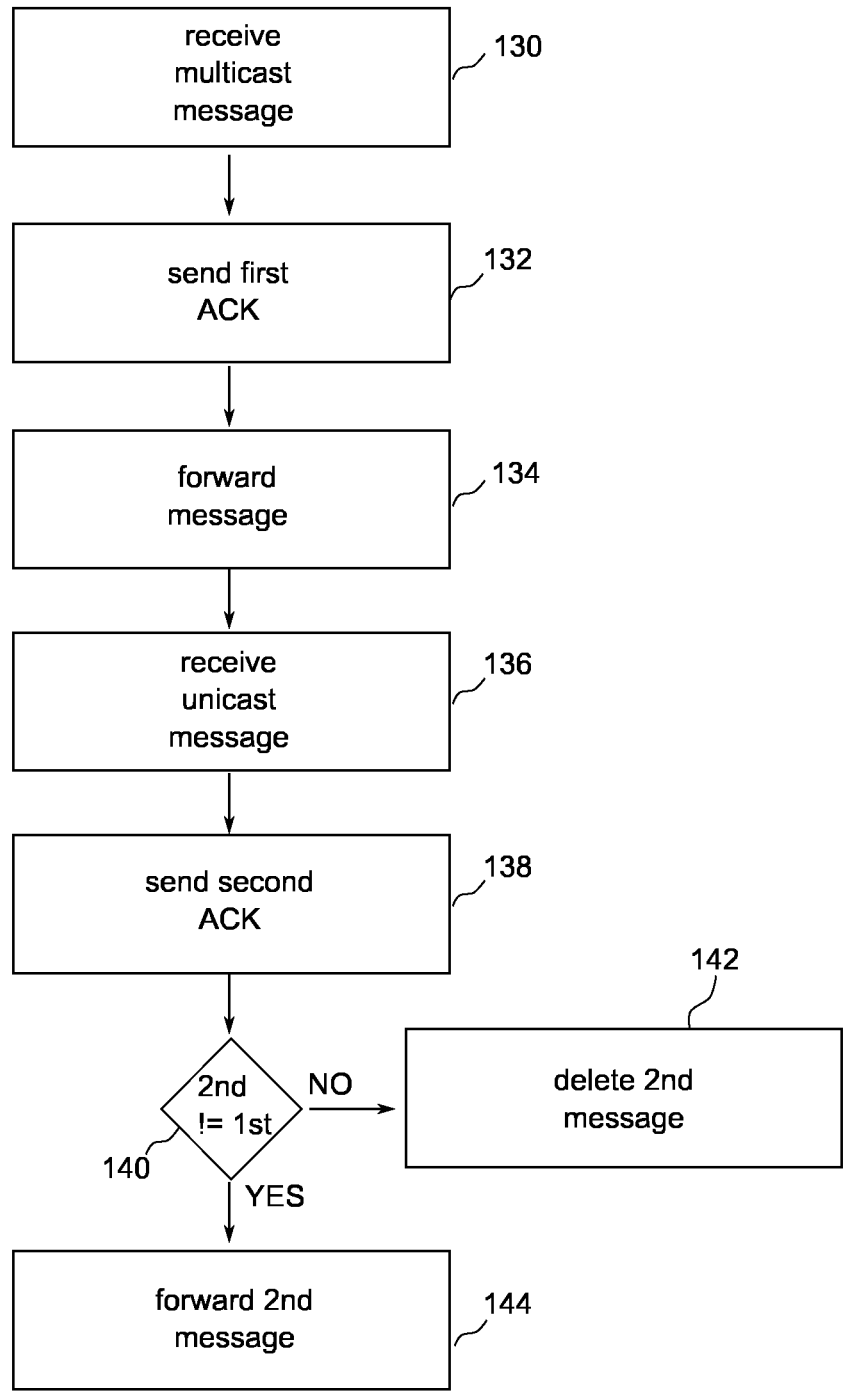
FIG. 9 schematically shows a block diagram of a further embodiment of a method for receiving a message from a sender over a network.

FIG. 9 schematically shows a block diagram of a further embodiment of a method for receiving a message from a sender over a network. A first message is received from the sender via a multicast protocol in a first receiving step 130. A first acknowledgement message is sent to the sender in a first acknowledgement step 132, the first acknowledgement message indicating a receipt of the first message. The first message is forwarded to an associated application in a first message handling step 134. A second message is received from the sender via a unicast protocol in a first receiving step 136. A second acknowledgement message is sent to the sender in a second acknowledgement step 138, the second acknowledgement message indicating a receipt of the second message. In a comparison step 140, it is determined, whether the first message is identical to the second message. In a deletion step 142, the second message is deleted without forwarding it to the associated application when the first message is identical to the second message.

In an optional second message handling step 144 the second message may be forwarded to its associated application when the first message is not identical to the second message.

Figure 10:
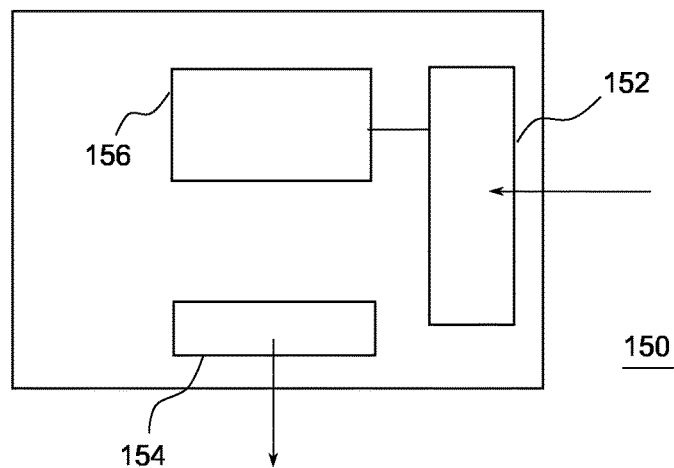
FIG. 10 shows a block diagram of a receiver according to an embodiment of the present invention.

FIG. 10 shows a block diagram for a receiver 150 according to an embodiment of the present invention. The receiver comprises a receiver 152 which is operable to receive a first message from the sender via a multicast protocol and a second message via a unicast protocol. The receiver further comprises a sender 154 operable to send a first acknowledgement message and a second acknowledgement message to the sender, the first acknowledgement message and the second acknowledgement messages indicating a receipt of the first and second messages, respectively. Furthermore, the receiver 150 comprises a message handler 156 operable to forward the first message to an associated application and to delete the second message when the first message is identical to the second message. To this end, the message handler 156 may optionally be directly coupled with the receiver 152.

Figure 11:
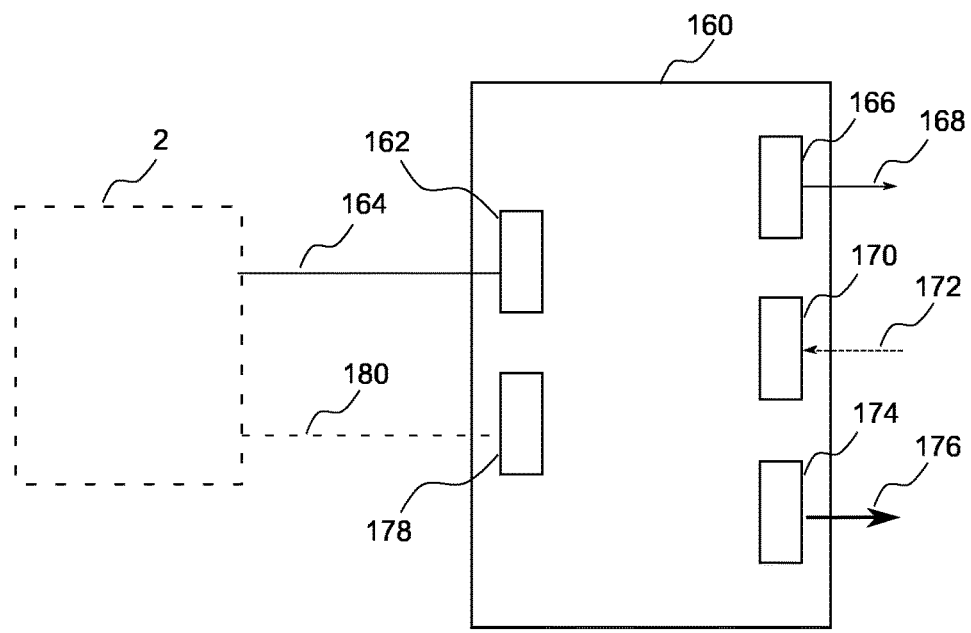
FIG. 11 shows a block diagram of an embodiment of a network interface.

FIG. 11 shows a block diagram of an embodiment of a network interface 160 for converting a multicast communication to an efficient multicast communication. The network interface 160 comprises an uplink receiver 162 operable to receive a multicast message 164 from a sender 2 which is directed to a set of multiple receivers. The network interface 160 further comprises a downlink multicast-sender 166 operable to send a multicast message 168 to the multiple receivers. A downlink receiver 170 is operable to receive acknowledgement messages 172 from a subset of the receivers, each acknowledgement message indicating the receipt of the message by a single receiver. A downlink unicast-sender 174 of the network interface 160 is operable to send a unicast message 176 to a receiver of the set of receivers which is not part of the subset of the receivers.

The network interface 160 optionally comprises an uplink-sender 178 operable to send an uplink acknowledgement message 180 to the sender 2, the uplink acknowledgement message 180 indicating the receipt of the message by a receiver from the subset of the receivers.

In summarizing the embodiments discussed above, messages or events are, for the first time, send to all receivers or to all addressed nodes via a multicast message. This may be implicitly achieved by sending a single message to a multicast address, such as for example to an IP-multicast address, when the remaining network equipment which is in charge of distribution and routing of messages, that is e.g. switches and routers in the network, comply with IP-multicast. Hash values are computed for sent packages and stored in a queue. A special signal handler is used which receives acknowledgment packages from the receivers. The acknowledgment packages comprise the hash value of the packet received at the receiver side. A queue on the sender thus comprises the information, that one particular receiver has received a particular packet and acknowledged the receipt. When a receiver does not acknowledge the receipt of a particular packet within the predetermined amount of time (a minimum retransmission interval, which can also be adapted, based on the experience of the acknowledgment packages in the past), the packet or the event is again transmitted to the receiver using a unicast protocol, such as UDP.

This assures that other nodes in the network do not have to process additional packets unnecessarily. According to some implementations, the port for the UDP messages may be derived from the port number used for the multicast messages by incrementing the port number by unity. It goes without saying that further algorithms to determine the UDP-port may be implemented. For example, the ports may be dynamically distributed via special management messages or arbitrated at that subscription to the secure multicast by the receiver. This subscription to the secure multicast may, for example, be performed using TCP/IP at the sender such as to provide that the subscription is performed secure. Since the subscription is normally only performed once per session, the overhead of the TCP/IP connection for the one-time subscription may be acceptable. In case one acknowledgment message is lost, the sender would retransmit the message for the packet using UDP. Therefore, a receiver receiving a UDP-packet is operable to check, whether the hash value of the associated packet was already previously acknowledged. If this was the case the, the content of the package, that is, the message, is not forwarded to the associated application but deleted instead, while again sending an acknowledgment package such as to avoid further retransmission of the sender.

According to some embodiments, a transmitter for transmitting a message from a sender to a set of multiple receivers over a network, comprises a multicast sender operable to send a multicast message to the multiple receivers; a receiver operable to receive acknowledgement messages from a subset of the receivers each acknowledgement message indicating the receipt of the message by a single receiver; and a unicast sender operable to send a unicast message to a receiver of the set of receivers which is not part of the subset of the receivers.

According to some embodiments, a receiver for receiving a message from a sender over a network, the receiver comprises a receiver operable to receive a first message from the sender via a multicast protocol and a second message via a unicast protocol; a sender operable to send a first acknowledgement message and a second acknowledgement message to the sender, the first acknowledgement message and the second acknowledgement messages indicating a receipt of the first and second messages, respectively; and a message handler operable to forward the first message to an associated application and to delete the second message when the first message is identical to the second message.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functional blocks denoted as "means for . . . " (performing a certain function) shall be understood as functional blocks comprising circuitry that is adapted for performing a certain function, respectively. Hence, a "means for s.th." may as well be understood as a "means being adapted or operable for s.th.". A means being adapted for performing a certain function does, hence, not imply that such means necessarily is performing said function (at a given time instant).

Functions of various elements shown in the figures, including any functional blocks may be provided through the use of dedicated hardware, as e.g. a processor, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim. Particularly, when a dependent claim is referring to an encoder or a sender, the corresponding feature of the related decoder or receiver shall herewith also be included and become part of the disclosure of the description.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons.

Furthermore, in some embodiments a single step may include or may be broken into multiple substeps. Such substeps may be included and part of the disclosure of this single step unless explicitly excluded.

The invention claimed is:

1. A method for transmitting a message from a sender to a set of multiple receivers over a network, the method comprising:
   sending a multicast message to the multiple receivers;
   receiving acknowledgement messages from a subset of the receivers, each acknowledgement message indicating the receipt of the multicast message by a single receiver; and
   sending a unicast message to a receiver of the set of receivers which is not part of the subset of the receivers,
   wherein the multicast message is sent from a first event detector to a second event detector of an event based analysis framework, wherein the first event detector is configured to operate on a data stream to detect an event based on the data stream, wherein the multicast message comprises information about the event detected by the first event detector based on the data stream.

2. The method of claim 1, wherein the unicast message is sent after a predetermined period of time after sending of the multicast message.

3. The method of claim 1, further comprising:

comparing subscriber data comprising identification information for each receiver of the set of receivers with corresponding identification info anon of the acknowledgement message to identify a receiver of the subset of receivers.

4. The method of claim 3, further comprising:

receiving a request for transmission from a joining receiver; and adding identification information of the joining receiver to the subscriber data.

5. The method of claim 1, further comprising:

adding a message identification information for the multicast message to sent message data, the sent message data comprising message identification information for a set of messages sent by a multicast message.

6. The method of claim 5, further comprising:

deleting message information from the sent message data for a message for which an acknowledgement message has been received from all receivers of the set of receivers.

7. The method of claim 1, wherein the unicast message is sent using an ordered or an unordered unicast protocol.

8. The method of claim 1, wherein the unicast message is sent using the UDP protocol.

9. The method of claim 1, wherein the network is a wired network.

10. The method of claim 1, wherein a second multicast message is sent to the set of receivers instead of the unicast message, when a number of receivers in the subset is greater than a predetermined fraction of a number of receivers in the set of receivers.

11. A method for receiving a message from a sender over a network, the method comprising:

receiving a first message from the sender via a multicast protocol and a second message via a unicast protocol;

sending a first acknowledgement message and a second acknowledgement message to the sender, the first acknowledgement message and the second acknowledgement messages indicating a receipt of the first and second messages, respectively;

forwarding the first message to an associated application; and deleting the second message without forwarding it to the associated application when the first message is identical to the second message, wherein the first message is a multicast message sent from a first event detector to a second event detector of an event based analysis framework, wherein the first event detector is configured to operate on a data stream to detect an event based on the data stream, wherein the multicast message comprises information about the event detected by the first event detector based on the data stream.

12. The method of claim 11, further comprising:

forwarding the second message to the associated application when the second message is not identical to the first message.

13. The method of claim 11, further comprising:

adding first message identification information for the first message to received message data, the received message data comprising message identification information for a set of messages received via the multicast protocol; and comparing corresponding second message identification information for the second message with the first message information for the first message, to conclude whether the first message is identical to the second message.

14. A network interface for converting a multicast communication to an efficient multicast communication, comprising:

an uplink receiver operable to receive a multicast message from a sender which is directed to a set of multiple receivers;

a downlink multicast sender operable to send a corresponding multicast message corresponding to the multicast message to the multiple receivers;

a downlink receiver operable to receive acknowledgement messages from a subset of the receivers, each acknowledgement message indicating the receipt of the corresponding multicast message by a single receiver; and a downlink unicast sender operable to send a unicast message to a receiver of the set of receivers which is not part of the subset of the receivers, wherein the multicast message is sent from a first event detector to a second event detector of an event based analysis framework, wherein the first event detector is configured to operate on a data stream to detect an event based on the data stream, wherein the multicast message comprises information about the event detected by the first event detector based on the data stream.

15. The network interface of claim 14, further comprising:

an uplink sender operable to send an uplink acknowledgement message to the sender, the uplink acknowledgement message indicating the receipt of the multicast message by a receiver from the subset of the receivers.

* * * * *